July 9, 1940.  R. A. SANDBERG  2,207,164
AUTOMOBILE LOCKING AND CIRCUIT CONTROL STRUCTURE
Filed Feb. 10, 1939
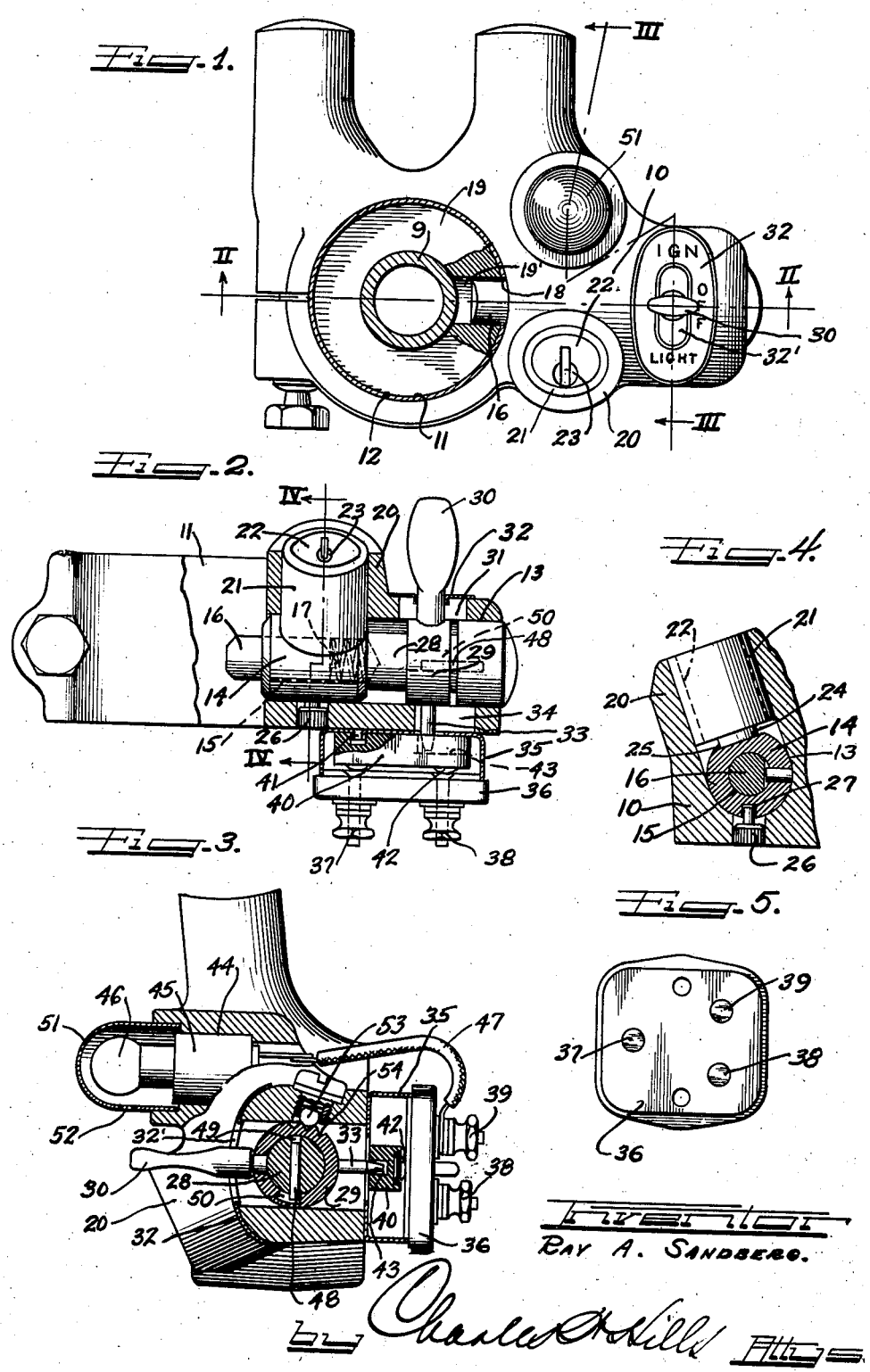

Patented July 9, 1940

2,207,164

UNITED STATES PATENT OFFICE 2,207,164

AUTOMOBILE LOCKING AND CIRCUIT CONTROL STRUCTURE

Ray A. Sandberg, Waukegan, Ill., assignor to Houdaille-Hershey Corporation, Detroit, Mich., a corporation of Michigan Application February 10, 1939, Serial No. 255,619

4 Claims. (Cl. 200—44)

My invention relates to automobile locking and circuit control structure and particularly to structure for locking some mechanical control and electrical control circuit against unlawful manipulation, as for example, lock structure applied to the steering wheel assembly for locking the steering and the ignition. In such types of locks, the lock cylinder operable by a key, or set by other means for locking or unlocking operation, is out of range of light on the instrument board or in the car body so that it is often inconvenient to find the keyhole of a key operable lock cylinder or to read the dial where a dial adjustable lock means is provided.

It is therefore an important object of my invention to provide illuminating means, usually an electric lamp, directly on the lock structure body or in such position adjacent thereto that the lamp rays will be thrown on the keyhole or other lock tumbler adjusting elements so that unlocking of the lock structure for vehicle operation will be more convenient.

A further important object is to provide switch means operable by a common lever for control of the ignition circuit and the lighting circuit.

A further object is to provide interlocking arrangement between a steering locking bolt and the switch lever so that when the locking bolt is in steering locking position the switch lever can be actuated only for switching on the light circuit, but when the lock bolt is in steering unlocking position the switch lever may be actuated to switch on either the ignition circuit or the light circuit, and which interlock will make it impossible to shift the bolt back to steering locking position until the ignition circuit has been switched open by the lever.

The various features of my invention are incorporated in the structure disclosed on the drawing, in which drawing:

Figure 1 is a plan view of the lock structure mounted on the steering column;

Figure 2 is a section on plane II—II Figure 1;

Figure 3 is a section on plane III—III Figure 1;

Figure 4 is a section on plane IV—IV Figure 2; and

Figure 5 is a plan view of the switch box cover.

The lock structure shown comprises the laterally extending body 10 having the passageway 11 for receiving the steering column 12 in an automobile, through which steering column the steering shaft 9 extends for connection at its upper end with the steering wheel (not shown). Extending longitudinally through the body 10 is the bore 13 for the steering lock bolt structure 14 which at its front end has the bore 15 for the bolt 16 urged outwardly by a spring 17. When the bolt structure is shifted to its inner or locking position, the end of the bolt 16 will extend through the hole 18 in the steering column and into the recess 19' in the bushings 19 secured to the steering shaft to lock the steering shaft against operation.

Adjacent to the inner end of the bolt structure, the body 10 has the boss 20 for housing the lock casing 21 in which a lock cylinder 22 is rotatable by a key inserted in the keyhole 23, the cylinder at its inner end having a cam 24 for engagement with the slot 25 in the bolt structure so that when the lock cylinder is turned, the bolt structure will be shifted into locking or unlocking position. The bolt structure is held against rotational movement by a pin 26 extending into the longitudinal channel 27 in the bolt structure body.

Intermediate its ends, the bolt structure body has the portion 28 of reduced diameter for receiving the hub 29 from which the switch operating lever 30 extends outwardly through a passageway 31 in the lock body, the passageway being covered by an escutcheon plate 32 which holds the lever against lateral movement but permits swing thereof for rotation of the hub 29.

On the rear side of the hub 29, a pin 33 extends through the passageway 34 in the lock body and into the switch box 35 secured against the lock body. This switch box is closed by a cover 36 of insulating material which on its inner sides presents three terminals 37, 38 and 39. Within the box 35 is the switch block 40 pivoted at its inner end by a pivot projection 41 extending from the bottom of the switch box, the pivot connection being in line with the terminal 37. The switch block carries a switch blade 42 whose one end is always in contact with the terminal 37 and whose other end contacts with either of the terminals 38 and 39 when the switch block is swung, the switch block on its inner side having a channel 43 receiving the end of the pin 33 so that when the lever 30 is swung the switch block will be correspondingly swung for engagement of its switch blade with the terminal 38 or 39.

Rearwardly of the lock cylinder boss 20, the lock body has the recess or pocket 44 for housing a terminal socket 45 for an electric lamp 46. Current for the ignition circuit and for the lamp is provided from the vehicle battery which may have its negative pole grounded, the positive pole of the battery being connected with the switch terminal 37. The ignition circuit will extend from the terminal 38, and the terminal 39 is connected by a conductor 47 with one terminal of the lamp socket 45 whose other terminal is grounded to the lock body.

An interlocking arrangement between the lock bolt structure and the switch lever structure comprises a key 48 secured in the diametrically extending slot 49 in the lock bolt structure and projecting at one end into a channel 50 which extends in axial direction in the inner side of the switch lever hub 29.

Normally the switch block will be in its intermediate position disconnected from either of the contacts 38 and 39. When the lever is swung rearwardly the switch block will swing for engagement of the blade with the terminal 38 connecting with the ignition circuit, and when the lever is swung forwardly the switch blade will contact the terminal 39 of the lamp circuit. The length of the slot 32' in the escutcheon plate 32 is such as to limit the swung of the lever for proper engagement of the switch blade with the switch terminals. When the lock bolt structure is in its steering locking position, the key 48 will be within the channel 50 in the switch lever hub and will be engaged by the forward wall of the channel so that the lever will be prevented from rearward swing to switch on the ignition. However, the circumferential extent of the channel is sufficient so that the lever may be swung forwardly for switching on the lamp circuit.

When the lock bolt structure is shifted outwardly to unlock the steering, the key 48 will be withdrawn from the channel 50 and the lever structure will be free for full swing in either direction to switch on either the ignition circuit or the light circuit. When the switch lever has been swung to switch on the ignition circuit while the steering is unlocked, the channel 50 will have been moved beyond the key 48 so that the lock bolt structure cannot be shifted back to locking position until the switch lever has been swung back to re-position the channel 50 in alignment with the key. However, if the light circuit were switched on by the lever while the steering is unlocked, the channel 50 will be in alignment with the key and the lock bolt 14 will be free to be shifted back to locking position and the light circuit will remain closed and can be reopened if desired after relocking of the steering by forward swing of the lever. Thus, with the construction and arrangement shown and described, when the lock bolt structure is shifted into steering locking position the key 48 thereon will lock the switch lever against switching on of the ignition circuit but will leave it free for switching the light circuit on and off, and when the lock bolt has been shifted to steering unlocking position the switch lever is free for switching on either the ignition circuit or the light circuit. This arrangement of requiring switching off of the ignition circuit before switching on the light circuit is a desirable factor of safety. The light from the lamp 46 besides being utilized for illuminating the lock cylinder may also be used for other purposes, as for example, consulting a road map or other data or information. This would take the driver's eyes away from the road and accidents might readily result if the car were traveling while he was consulting a road map or reading other information. By making it necessary to switch off the ignition before turning on the light, the driver would have to stop the car before switching on the light and accidents would be prevented.

Preferably, the lamp 46 is covered by a dome or turret 51 provided with a slit 52 through which a shaft of light would be projected onto the lock cylinder and the keyhole. The dome or turret may have friction seating engagement in the end of the pocket 44 in which the lamp socket is located so that the turret may be turned for desirable directioning of the light rays through the slit or aperture 52, or that it may be removed from the lamp if greater illumination is desired, as for example, for reading or other purposes. The slit or aperture may be of any size depending upon the degree of illumination desired and the light rays through the slit will not interfere with the driving vision of the driver. It is not necessary that the lamp be mounted directly on the lock structure body for it might conveniently be mounted on the instrument board in position to throw its rays over the lock and switch structure, or to be used for reading or other purpose.

A spring pressed detent member such as a ball 53 may be provided for engagement with notches 54 in the switch lever hub for yieldingly holding the switch lever structure in its various positions of circuit control.

I have shown a practical and efficient embodiment of the various features of my invention but I do not desire to be limited to the exact construction, arrangement and operation shown and described as changes and modifications may be made without departing from the scope of the invention.

I claim:

1. In combination in locking structure, a locking bolt movable to locking or unlocking position, a switch and two electrical circuits selectable and controllable thereby when said locking bolt is in unlocking position, and means controlled by the movement of said locking bolt to locking position for locking said switch against operation for control of one of said circuits but permitting operation of the switch for control of the other circuit.

2. Locking structure in an automobile comprising a locking bolt movable to lock or unlock the steering, an electrical switch for controlling the ignition circuit and another circuit, said switch being freely operable for control of either circuit when said locking bolt is in unlocking position, and means effective when said locking bolt is in steering locking position for holding said switch against closure of the ignition circuit but permitting opening and closing of the other circuit.

3. In automobile locking structure, a locking bolt movable to lock or unlock an automobile control, an electrical switch for controlling an ignition circuit and another circuit, and means effective when said bolt is in locking position to hold said switch against opening of the ignition circuit while permitting opening or closing of the other circuit, said means being effective when said bolt is in unlocking position to permit operation of the switch for control of either circuit for closure or opening thereof, the switch arrangement being such that the ignition circuit is opened before the other circuit is closed.

4. In an automobile, a lock structure adjacent the steering wheel comprising a lock bolt and key controlled means for shifting it to lock or unlock the steering, an electrical switch for controlling the ignition circuit and another circuit, an operating lever for said switch, locking means effective when said locking bolt is moved to locking position for locking said lever against movement thereby of the switch to close the ignition circuit but leaving the lever free for operation of the switch to close or open the other circuit, said locking means releasing said lever when said locking bolt is moved to unlocking position whereby said lever may then be operated for switch control for closing or opening either of said circuits.

RAY A. SANDBERG.